US009624035B1

(12) United States Patent
Williams, Jr.

(10) Patent No.: US 9,624,035 B1
(45) Date of Patent: Apr. 18, 2017

(54) SYSTEM AND METHOD FOR THE STORAGE, RETRIEVAL AND DELIVERY OF ITEMS IN AN AUTOMATED CLOSET

(71) Applicant: Charles E. Williams, Jr., Ann Arbor, MI (US)

(72) Inventor: Charles E. Williams, Jr., Ann Arbor, MI (US)

( * ) Notice: Subject to any disclaimer, the term of this patent is extended or adjusted under 35 U.S.C. 154(b) by 0 days.

(21) Appl. No.: 14/809,416

(22) Filed: Jul. 27, 2015

(51) Int. Cl.
B65G 17/20 (2006.01)
B65G 1/137 (2006.01)
B65G 1/04 (2006.01)

(52) U.S. Cl.
CPC ......... B65G 1/1371 (2013.01); B65G 1/0457 (2013.01); B65G 17/20 (2013.01)

(58) Field of Classification Search
CPC .... B65G 1/1371; B65G 1/133; B65G 1/0457; B65G 17/20; B65G 35/06; B65G 2201/0229
USPC .... 198/465.2, 465.4, 678.1, 687.1; 312/268; 211/1.56
See application file for complete search history.

(56) References Cited

U.S. PATENT DOCUMENTS

| | | | | |
|---|---|---|---|---|
| 2,880,878 A | * | 4/1959 | Collette | A47F 3/08 104/94 |
| 2,967,081 A | * | 1/1961 | Kleinpenning | A47B 61/00 186/26 |
| 3,415,385 A | * | 12/1968 | Rossello | B65G 1/0457 211/1.57 |
| 5,680,528 A | | 10/1997 | Korszun | |
| 6,009,991 A | * | 1/2000 | Anderson | B65G 1/1371 198/349 |
| 7,133,740 B1 | * | 11/2006 | Stenson | G06Q 10/08 700/213 |
| 7,212,885 B2 | | 5/2007 | Diaz et al | |
| 8,014,979 B2 | | 9/2011 | Jaworski et al. | |
| 2003/0097201 A1 | * | 5/2003 | Min | B65G 1/133 700/229 |
| 2006/0005071 A1 | | 1/2006 | Fu | |
| 2006/0214544 A1 | | 9/2006 | Shai | |
| 2008/0082395 A1 | | 4/2008 | Shulman et al. | |
| 2016/0125685 A1 | * | 5/2016 | Odisho | G07F 17/10 198/678.1 |

* cited by examiner

*Primary Examiner* — William R Harp
(74) *Attorney, Agent, or Firm* — Craig Hoersten

(57) ABSTRACT

An automatic closet system for inventorying, storing, retrieving, tracking and chronologically monitoring items of clothing to and from a closet storage area with the system including a track that extends around the inner perimeter of the storage area with the track having front and rear guides. A chain is positioned on the rear track guide and is driven by a motor. Hanger carriers are disposed in the track and receive hangars therein. The carrier includes sensors used to detect and track each hanger and the garment thereon.

19 Claims, 9 Drawing Sheets

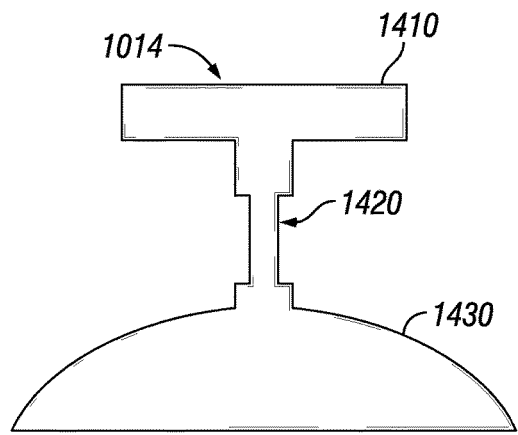
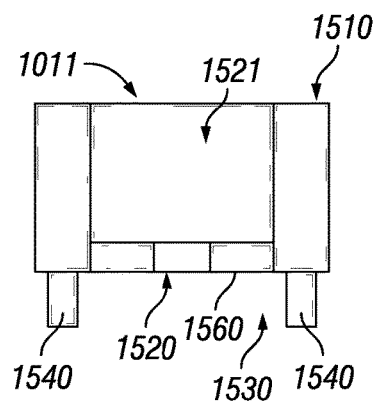
FIG. 4A   FIG. 4B
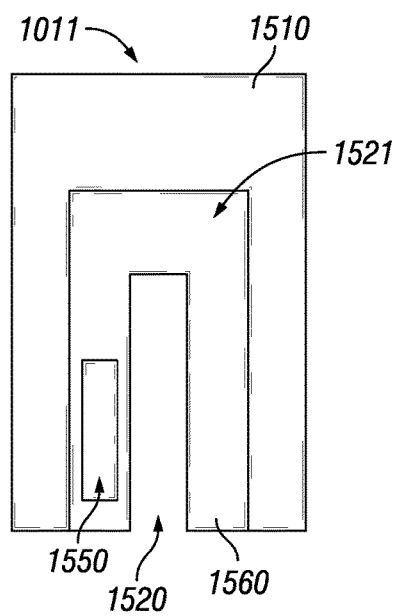
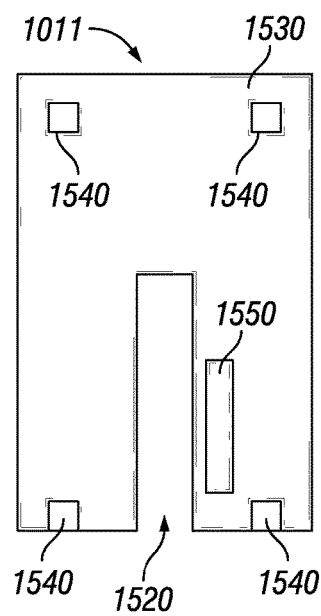
FIG. 4C   FIG. 4D

Month Screen — 6500

← July →   Add Program

| S | M | T | W | T | F | S |
|---|---|---|---|---|---|---|
|   | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |   |   |   |

Back     Home

Day Screen — 6600

Monday July 17, 2014

10

11     Blue Sweater
       82 degree F / Fresh Scent

Noon

1

2

Back     Home

FIGURE 6b

SYSTEM AND METHOD FOR THE STORAGE, RETRIEVAL AND DELIVERY OF ITEMS IN AN AUTOMATED CLOSET

FIELD OF THE INVENTION

This invention relates generally to an automated closed system, and in particular, but not by way of limitation, to a system and method that facilitates a user's ability to automatically and manually store, retrieve and access clothing items from a closet system at user specified times and sequences.

BACKGROUND

Typical conveyor rack closet systems utilize a typical chain style conveyor system that a user manually controls. This type of system typically only allows a user to control the system in a forward and reverse direction, whereby the user can merely browse the available clothing as the conveyor system passes the clothing by the user. Similarly, when a user desires to put an item of clothing back into the system, the user must move the conveyor system and search for an empty space on the conveyor system to place the item.

Accordingly, there is a need for systems and methods for an automated closet system that can facilitate a user's ability to retrieve and store their clothing, as well as provide the user with various types of information related to the stored clothing.

BRIEF DESCRIPTION OF THE SEVERAL VIEWS OF THE DRAWINGS

FIGS. 4A-4E illustrate various views of hanger and carrier components of an embodiment of an automated closet system in accordance with the present invention;

FIGS. 6a and 6b illustrate examples screens that can be displayed on the display unit of an embodiment of an automated closed system in accordance with the present invention.

DETAILED DESCRIPTION OF THE INVENTION

Figure 1:
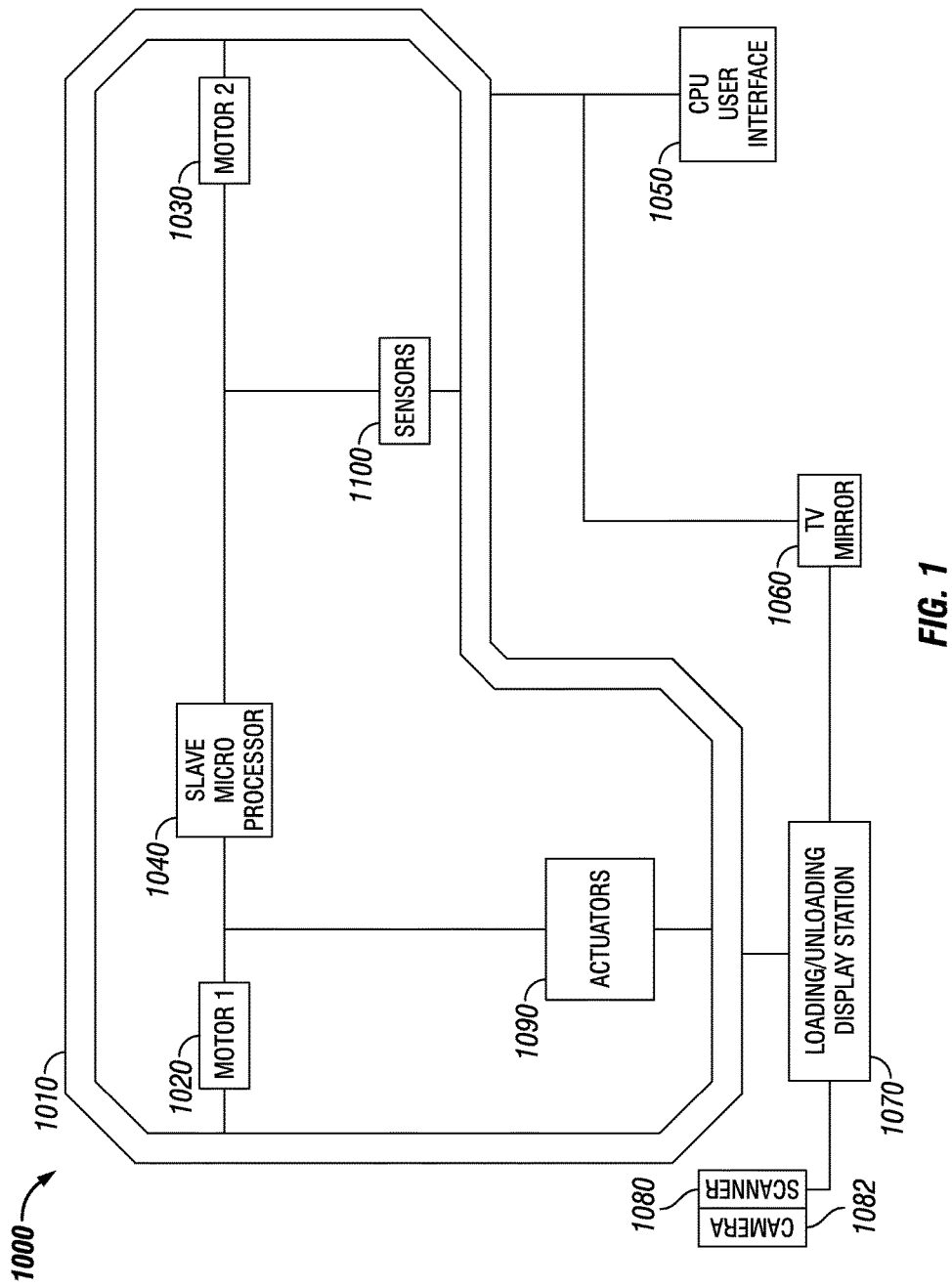
FIG. 1 is a high level electrical system drawing of an embodiment of an automated closet system in accordance with the present invention.

Referring now to the figures, wherein various elements depicted therein are not necessarily drawn to scale and wherein, through various views and figures, like elements may be referenced with identical reference numerals, there is illustrated embodiments of an automated closet system according to the principles of the present invention.

FIGS. 1 and 2 illustrate system level block diagrams of certain electrical and mechanical components of embodiment of an automated closet system ("ACS") 1000 in accordance with the principles of the present invention. ACS 1000 automatically inventories, stores, tracks, dates, retrieves items of clothing from storage area. ACS 1000 can illustrate to a user via graphical display illustrations or images of selected items of clothing and further can display illustration or images of the selected items of clothing on the user with various background environments.

Figure 2A:
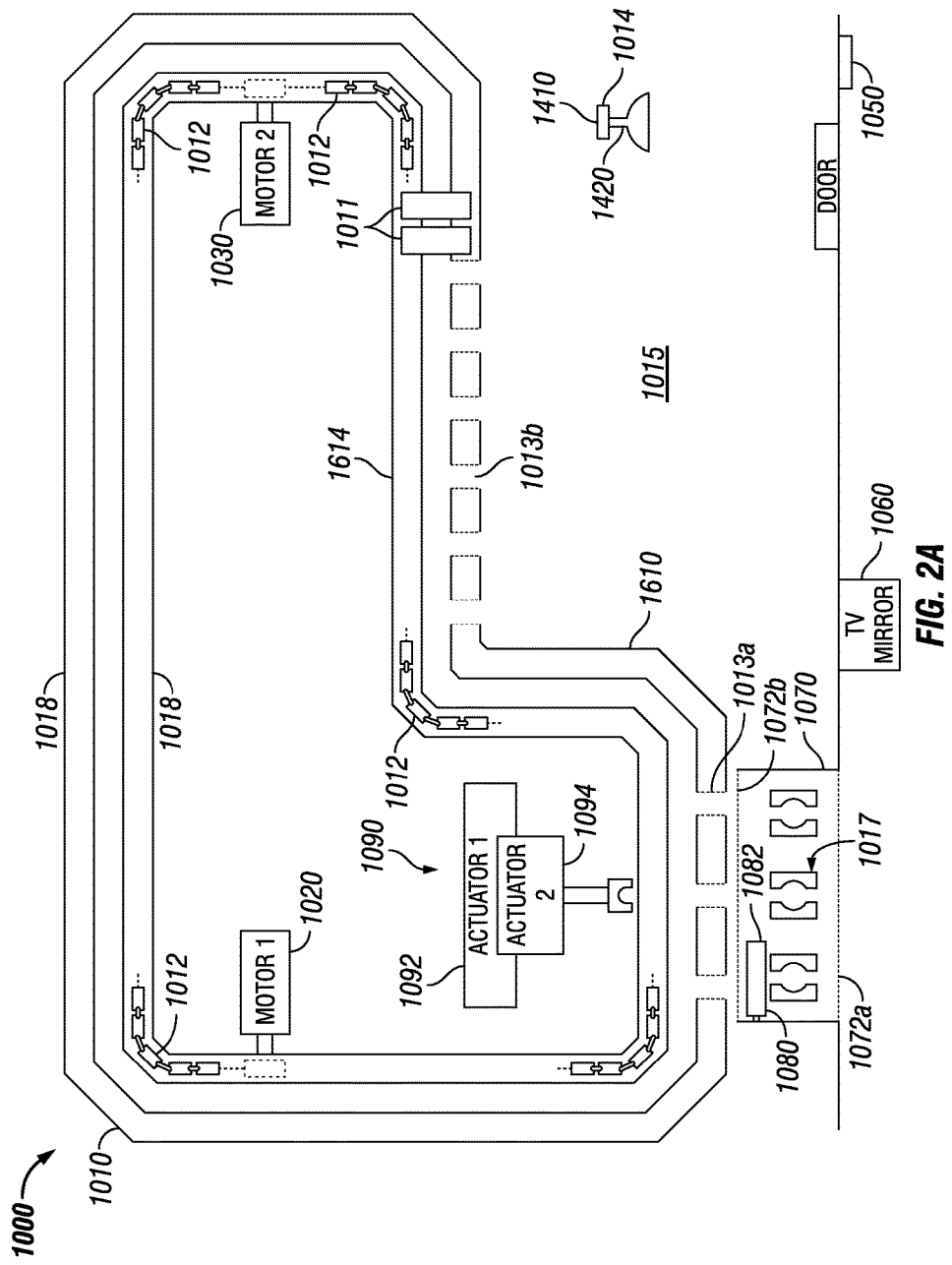
FIG. 2A is a high level mechanical system drawing of an embodiment of an automated close system in accordance with the present invention.
Figure 2B:
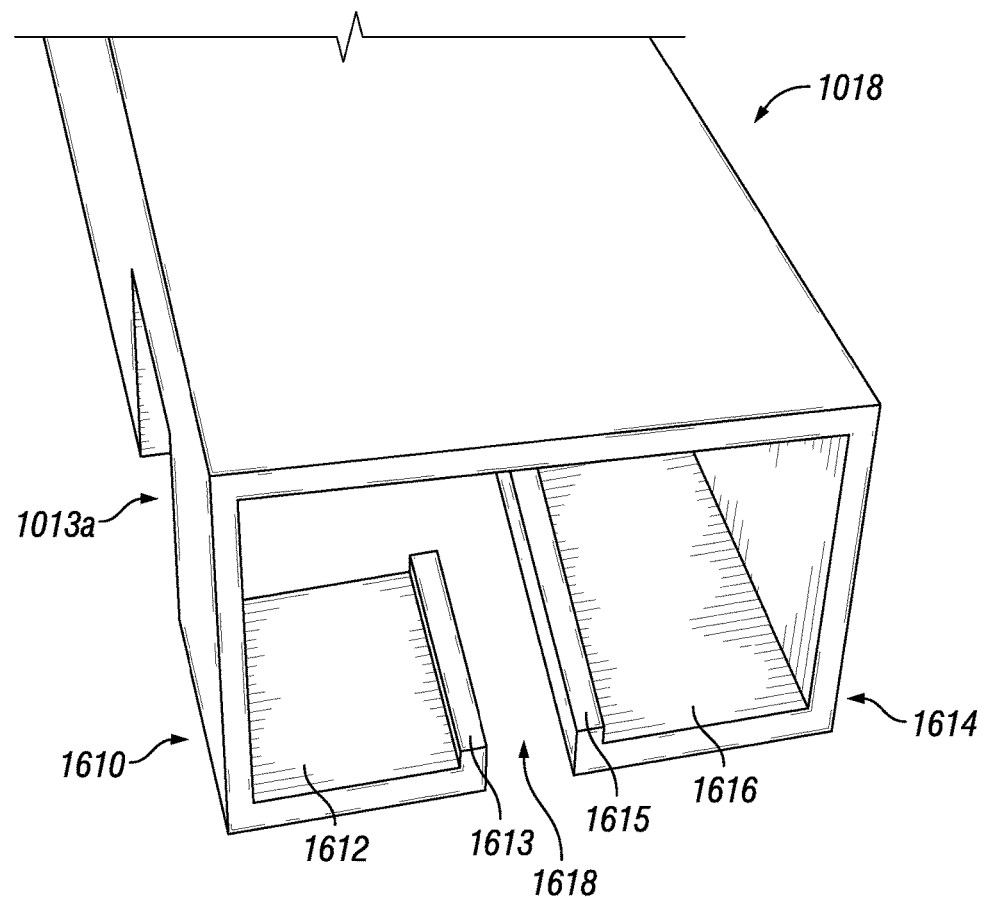
FIG. 2B is a partial perspective cross-sectional view of the track of an embodiment of an automated closed system in accordance with the present invention.

Referring now to FIGS. 1, 2A and 2B, ACS 1000 includes a conveyor or track system 1010, motors 1020 and 1030, a slave microprocessor controller 1040, a computer processing unit and user interface 1050, a television (TV) mirror 1060, a loading/unloading display station 1070, a scanner 1080, actuators 1090, and sensors 1100.

Track system 1010 includes a track 1018 containing a chain 1012 that extends around the perimeter of track system 1010. The chain 1012 of track system 1010 can move in either direction (such as a clockwise and counter clockwise) and is connected to and driven by motors 1020 and 1030. Although illustrated as utilizing two motors 1020 and 1030, the number, size, power and location of motors is dependent upon the size of track system 1010 utilized in specific implementations of the present invention. The track system 1010 has access points 1013a and 1013b, with access points 1013a being located near the loading/unloading display station 1070 which allow for hangers 1014 to be automatically placed into and removed from track system 1010, while access points 1013b are located inside the closet area 1015 and allows for a user to manually remove/place garments to/from the ACS 1000.

A plurality of carriers 1011 positioned within track 1018 interface with chain 1012 for movement around track system 1010. Carriers 1011 securely hold hangers 1014 and allow for the placement and removal of the hangers 1014 from the track system 1010 either manually or by actuators 1090. Sensors 1100, such as infra-red sensors, are used to detect the presence or absence of a hanger 1014 in each of the carriers 1011.

Computer processing unit and user interface 1050 includes a computing system and user interface or input and display screen, such as a graphic touch screen. Computer processing unit and user interface 1050 is coupled (wired or wirelessly) to controller 1040 to communicate there between information corresponding to commands received from a user through the user interface 1050.

Controller 1040 interfaces with computer processing unit 1050, and based upon data/commands received from computer processing unit 1050, controller 1040 will control the distance that motors 1020 and 1030 need to move chain 1012 to properly move associated hangers 1014 to/from the track system 1010 and to and from the loading/unloading display station 1070. Controller 1040 further receives data from sensors 1100, scanner 1080, camera 1082, loading/unloading display station 1070, motors 1020/1030, front/rear access door 1072a/1072b and actuator 1090. This data is relayed to the computer processing unit 1050 for computations and/or memory storage. Computer processing unit translates user inputs into commands that are relayed to the controller 1040 to control sensors 1100, scanner 1080, camera 1082, loading/unloading display station 1070, motors 1020/1030, front/read access door 1072a/1072b, and actuator 1090. These functions allow for the delivery of specific clothing items/garments from the ACS 100 at specified dates and times. Controller 1040 may also control the different levels of warming or heating of the clothing/garments to be delivered, as well as controlling the infusion of fragrances to specific clothing/garments to be retrieved. It is contemplated that controller 1040 and computer processing unit 1050 are operable to save programming, both user input as well as pre-programmed programs, for controlling ACS 1000. Although illustrated as utilizing one controller 1040, the number, and location of controllers is dependent upon the size of track system 1010 and number of functions required in specific implementations of the present invention.

Sensors 1100 are also coupled to controller 1040 and are placed in the track system 1010 for detection of manual removal/insertion of a hanger 1014 from a carrier 1011 and hanger holder 1017 for the ACS 1000.

Actuators 1090 may be composed of either two single actuators, such as actuators 1092 and 1094 that are individually controlled actuators with one moving in an direction and the other moving in the 'Y' direction. It is also contemplated that instead of two individually controlled actuators, Actuators 1090 could be a single controlled actuator that is operable to be moved in both the 'X' and 'Y' directions. Actuators 1090 move hangers 1014 between the track system 1010 and hanger holders 1017, through the access points 1013a, proximate the loading/unloading display station 1070. The 'X' and 'Y' directional movement of actuators 1090 facilitates the precise loading/unloading of garments from ACS 1000 as well as facilitating the use of multiple access points 1013a, as well as multiple hanger holders 1017 in the loading/unloading station 1070.

Hangers 1014 are configured with a top portion that can be detected while in a carrier 1011 or in a hanger holder 1017. The neck portion 1420 of hanger 1014 constructed and shaped to facilitate quick and reliable connection with actuators 1090.

Loading/unloading display station 1070 (described in more detail in reference to FIG. 5) includes a user interface, front access door 1072a and rear access door 1072b, and is operable to receive specified garments from ACS 1000 and placed in hanger holders 1017. Station 1070 further facilitates the placement of garments, by the user, back into the ACS 1000. Station 1070 further includes scanner 1080, camera 1082 and various sensors used, in part, to track the removal and placement of garments from and into ACS 1000. The front/rear access doors are controlled by controller 1040 and synchronized with entry and exiting clothing/garments.

Television mirror 1060 is a device that utilizes a television screen and camera than enables a user to use the television screen as a mirror with a selection of backgrounds. The camera is used to capture images of the user and place the image of the user onto the television screen with a user selected background, selected from a plurality of stored backgrounds, on the television.

Referring now to FIG. 2B, there is a representative illustrated cross-sectional view of a portion of the track 1018 of the present invention. As illustrated, track 1018 includes an outer perimeter or front portion 1610 and an inner perimeter or rear portion 1614. Front portion 1610 includes a front track 1612 and rear portion 1614 includes a rear track 1616, with front track 1612 and rear track 1616 being separated by a slot 1618. Front track 1612 includes a front track guide or lip 1613 and rear track 1616 includes a rear track guide a lip 1615. In a preferred embodiment the chain 1012 is disposed on rear track 1616 and extends around the entire track system 1010. The size of track 1018 is configured to receive therein carriers 1011, with the front legs 1540 of each of carrier 1011 received on front track 1612 and the rear legs 1540 received on rear track 1616, with the rear legs 1540 of each carrier 1011 interfacing with the chain 1012 to facilitate the movement of each carrier 1011 around the track system 1010. By way of illustration, an access point 1013a is illustrated on the front portion 1610 of track 1018.

Figure 3A:
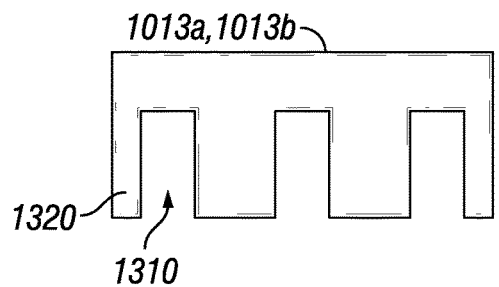
FIGS. 3A-3F illustrate various views of certain components of the track system of an embodiment of an automated closet system in accordance with the present invention.
Figure 3B:
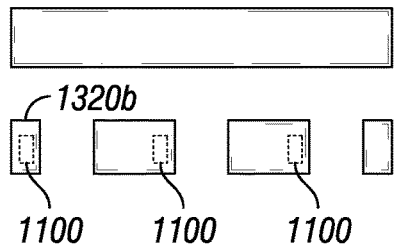
Figure 3C:
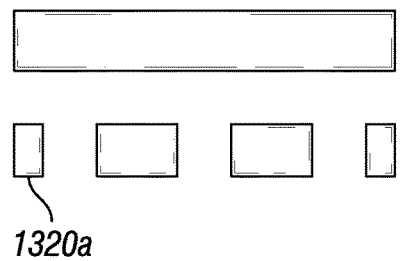

Referring now to FIGS. 3A-3F, there is illustrated various view of certain components of track system 1010. FIG. 3A illustrates the front view of access points 1013a and 1013b, with FIG. 3B illustrating the bottom view of access points 1013b and FIG. 3C illustrating the bottom view of access pints 1013a. Each of access points 1013a and 1013b include multiple slots 1310 that are separated by multiple dividers 1320. Access points 1013a (FIGS. 3A, 3C and 3D) are positioned proximate the loading/unloading display station 1070 and allow for hangers 1014 to be removed from track system 1010, through slots 1310 and placed upon hanger holders 1017 via actuators 1090, and further allow for hangers 1014 to be removed from hanger holders 1017, through slots 1310, and placed back onto track system 1010 via actuators 1090.

Referring to FIG. 3B, access points 1013b, which are located within closet area 1015, include sensors 1100 disposed therein to detect the manual removal and placement of clothing within ACS 1000 by a user.

Figure 3D:
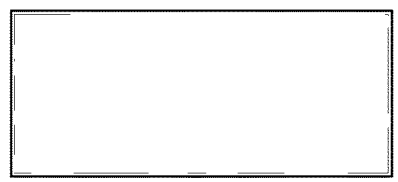
Figure 3E:
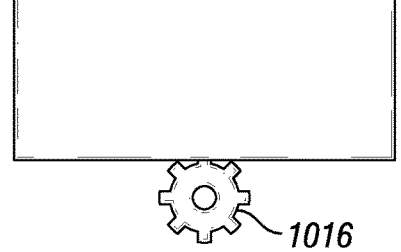
Figure 3F:
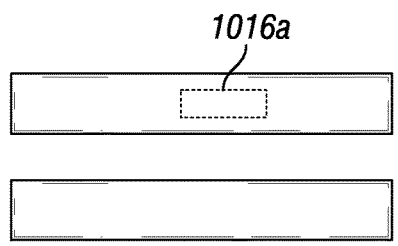

Referring to FIGS. 3D, 3E and 3F, there is illustrated a top view, front view and bottom view of a portion of the track system 1010 further illustrating the operation of the sprocket 1016 in the track system 1010, wherein the sprocket 1016 is connected to and driven by motor 1020 and interfaces with receptacles 1016a.

Figure 4E:
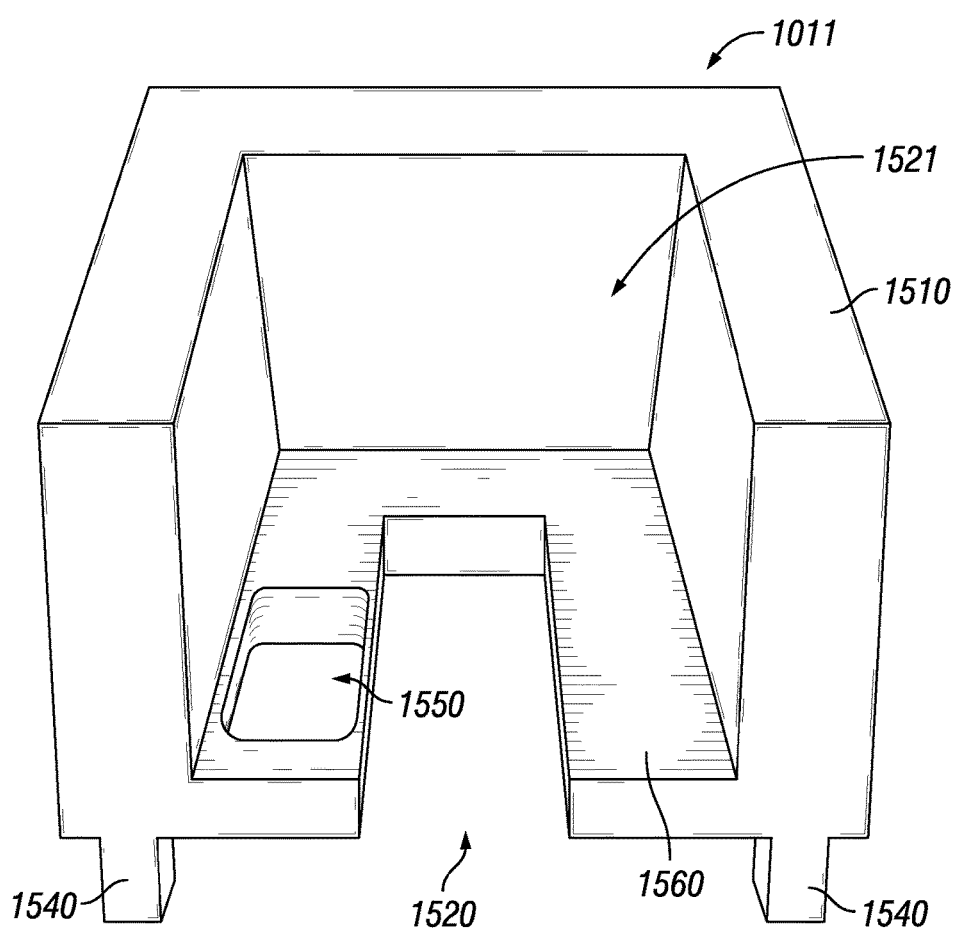

Referring now to FIGS. 4A-4E, there is illustrated a more detailed view of a hanger 1014 (FIG. 4A) as wells more detailed views of a carrier 1011, with FIGS. 4B, 4C and 4D being front view, top view and bottom view, respectively, and FIG. 4E being a front perspective view.

As illustrated in FIG. 4A, hanger 1014 includes a top portion 1410, a neck portion 1420 and a garment engaging portion 1430. Hanger 1014 and carrier 1011 are shaped to efficiently and reliably facilitate the engagement and disengagement of hanger 1014 within the cavity portion 1521 via channel 1520 of the carriers 1011 of track system 1010. The top portion 1410 of hanger is generally T-shaped and extends from the upper end of neck portion 1420. The horizontal portion or cross portion of the T-shaped top portion 1410 is of a length such that when inserted into the cavity portion 1521 a carrier 1011, it at least extends across the width the top 1510 of carrier 1011 and can engage thereon when inserted into carrier 1011.

The neck portion 1420 of hanger 1014 is of a width less than the width of channel 1520 of carrier 1011. The length of neck portion 1420 is such that when the top portion 1410 is engaged with the top 1510 of carrier 1011, the neck portion can 1420 extend into and through channel 1520, with garment engaging portion 1430 extending below carrier 1011.

The shape and length of neck portion 1420 is further facilitates the ability of clamps or grabbers of the actuators 1090 to precisely move the hanger 1014 between the carries 1011 of track system 1010 and the loading/unloading display station 1070. The carrier 1011 includes plurality of legs 1540 (4 being illustrated in FIG. 4D) that extend from the bottom 1530 of carrier 1011 whereby at least some of the legs 1540 are used to interface with the chain 1012 of track system 1010 to facilitate the movement of carrier 1011 (and therefore any hanger 1014 placed therein and any corresponding garment placed on hanger 1014). Carrier 1011 further includes an opening 1550 for sensors 1100 of track system 1010 to be able to facilitate the detecting of the presence or non-presence of a hanger 1014 within a carrier 1011. The opening 1550 extends from the bottom platform 1560 to the bottom 1530 of carrier 1011. In operation, each carrier 1011 is placed into track 1018 with the front two legs 1540 of carrier 1011 (legs proximate the opening of channel 1520) on the front track 1612 of track 1018, and the rear two legs 1540 of carrier 1011 (legs distal the opening of channel 1520) on the rear track 1616, whereby the rear two legs 1540 of carrier 1011 engage with and are moved by chain 1012.

Figure 5:
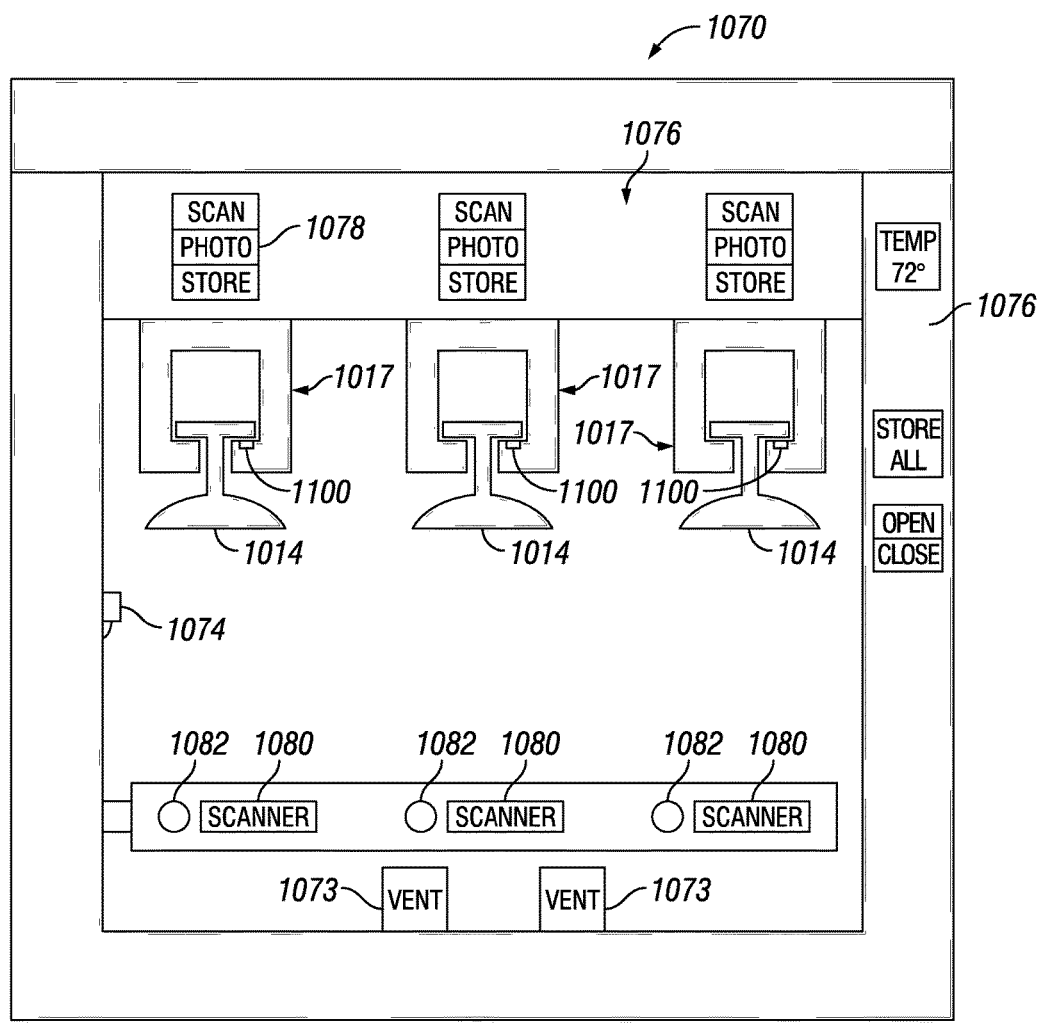
FIG. 5 illustrates a more detail view of a loading and unloading display station of an embodiment of an automated closet system in accordance with the present invention.

Referring now to FIG. 5, there is illustrated a more detailed view of an embodiment of the loading/unloading display station 1070. As illustrated loading/unloading display station 1070 includes hanger holders 1017, scanners 1080, cameras 1082, vents 1073, thermocouple 1074 and a touch screen interface 1076. The touch screen interface 1076 facilitates for the user the, by way of example, opening/closing of doors 1072, the storing of clothing items, the taking of photos of the garments, the scanning of items, and the display of the temperature of loading/unloading display station 1070. The touch screen interface 1076 is in operable communication with microprocessor controller 1040 and the computer processing unit 1050, such that when an interface icon 1078 is touched by the user, a corresponding data signal is generated by the touch screen interface 1076 to activate the function of the particular icon. Scanners 1080 are utilized to scan and input identifying data from RFID/barcode numbers associated with each piece of clothing/garment that is being placed/removed from ACS 1000. Cameras 1080 are utilized to take a digital image of the piece of clothing/garment, whereby the digital image is then associated with the identifying data scanned via the scanners 1080. Sensors 1100 are utilized to detect the presence or absence of a hanger 1014 within a hanger holder. Vents 1073 work in conjunction with thermocouple 1074, and are automatically adjusted in an open/close manner to corresponding measured temperatures measured by thermocouple 1074 within loading/unloading display station 1070. Temperature inside the loading/unloading display station can be manually adjusted or pre-programmed by the user.

Figure 6A:
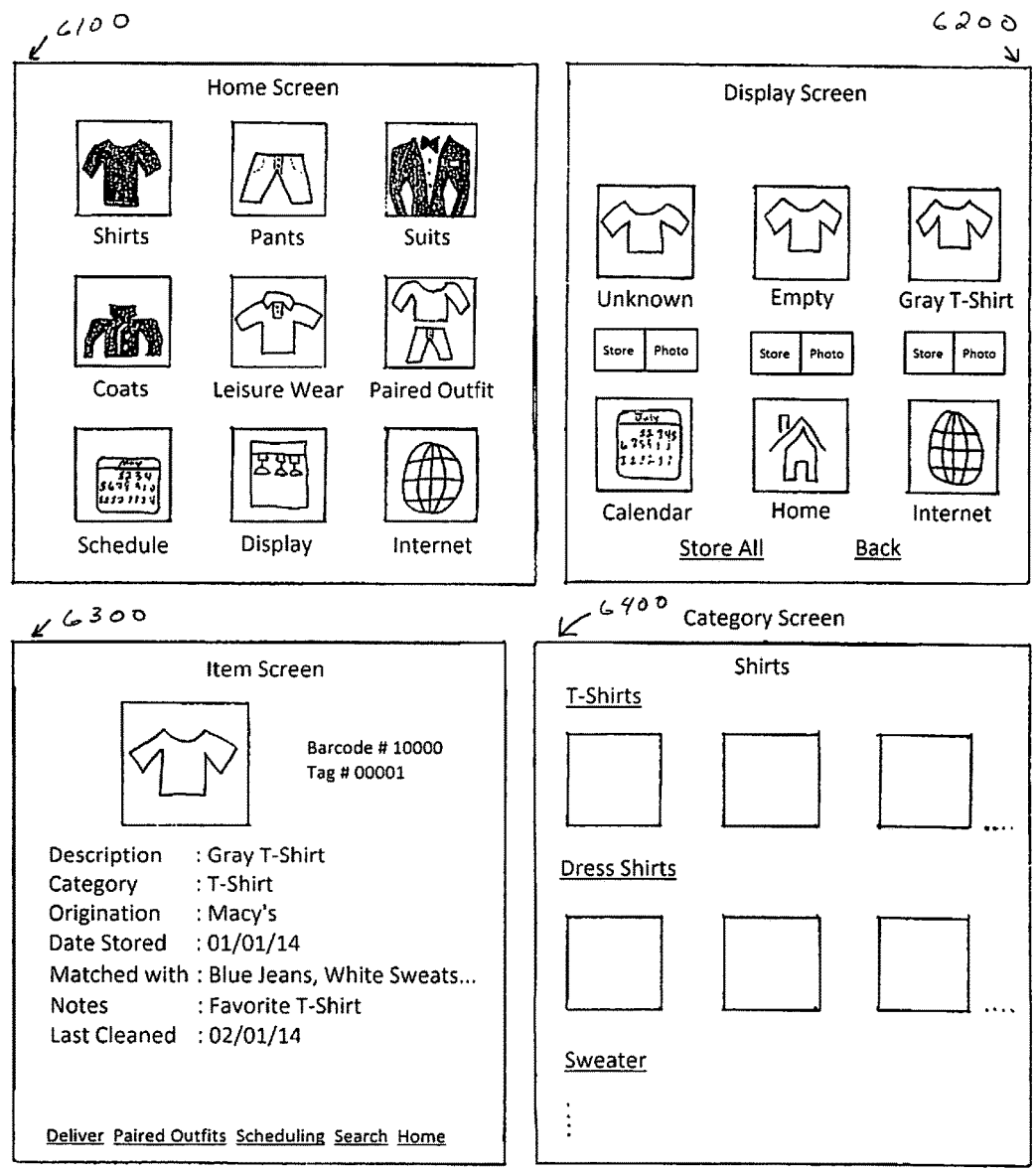

Referring now to FIGS. 6a and 6b, there are illustrated exemplary embodiments of interface screens utilizing thumbnails/icons that may be displayed at various times on touch screen interface 1076 during the operation the ACS 1000. Home screen 6100 includes icons that are utilized to facilitate various functions for a user. In this embodiment, the icons represent functions that: allow a user to view the inventory of stored items in ACS 1000; allow a user to schedule deliveries of inventoried items in ACS 1000 to the loading/unloading display station 1070; and also facilitates access to the internet. Display 6200 includes icons that are utilized to facilitate the loading/unloading of item in the loading/unloading display station 1070, as well as a calendar and the internet. Item screen 6300 illustrates an exemplary screen that allows a user to input information pertaining to an item to be stored in ACS 1000 facilitates, and further allows a user to edit/review/update information pertaining to an item already input into ACS 1000. Category screen 6400, illustrates a screen as a result of activating a selected category from home screen 6100. By way of example, if the shirts icon of home screen 6100, category screen 6400 would display icons of various types of shirts that have been entered into ACS 1000, and would further permit a user to select either a specific shirt or yet another sub-category of shirts.

The month screen 6500 and the day screen 6600 of FIG. 6b illustrated exemplary embodiment of calendars that can be access from any other screen displaying a calendar or schedule icon. The month screen 6500 allows a user to select a particular month and day, bringing up the day screen 6600 allowing a user to select a specific time on a selected day to schedule the delivery of a selected item to the loading/unloading display station. The display screens and icons illustrated in FIGS. 6a and 6b exemplary only, and it is contemplated to be within the scope of this invention that icons and setup of any particular screen could be arranged numerous variation based upon a number of factors, including a particular user's preference, the size of the screen, the types of garments to be stored in the ACS 1000 and the like.

Referring now to FIGS. 1-6 collectively, an exemplary operation of ACS 1000 will now be set forth. For an initial placement of a garment into ACS 1000, an RFID tag/sticker (or other form of unique identifier) is attached to the garment and the garment is then placed onto a hanger 1014. The doors 1072 of loading/unloading display station 1070 are open, whereby the garment and hanger 1014 are placed into the loading/unloading station 1070 onto a hanger holder 1017. The hanger holder 1017 detects the presence of a hanger 1014 therein. Upon the closing of the doors 1072, scanner 1080 will scan the RFID tag, comparing the scanned information with stored RFID tag data to determine if the item is a new item or an item that has already been stored into the system. Upon the determination that the item has not yet been identified, display screen 6200 will display the status any item on a hanger 1014 on a hanger holder, such as, unknown, empty or information pertaining to a previously stored item. If the information corresponding to an item's RFID tag has not been stored into the memory of the computer processing unit 1050, an "unknown" icon will be displayed. If scanner 1080 does not detect an RFID tag, a "no tag detected" icon can be displayed. If the scanner 1080 does not detect a tag, and there is no hanger detected by hanger holder 1017, an "empty" icon will be displayed accordingly. For items that are scanned and the information corresponding to the RFID tag indicate that the item has been previously entered, and icon and short description of the corresponding known item will be presented.

For unknown items, the user selects the "unknown" icon on the display screen 6200, bringing up an unpopulated item screen 6300, allowing a user to input any information corresponding to the new item, such as description, category, origination, date stored, stored items that match or are properly paired with the new item, user notes and when last cleaned. Additionally, the user can select the calendar icon to schedule time and date for the ACS 1000 to retrieve the item and deliver it to the loading/unloading display station 1070. It is contemplated that loading/unloading display station 1070 could be configured to deliver the garment at a user specified temperature, as well infusing the delivered garment with a user selected fragrance. In addition to the calendar option, the user is given an option to either take a picture of the new item with camera 1082, to select a previously stored image, or to access the internet to download a corresponding image. Additionally an image of the user wearing the item could be generated utilizing TV mirror 1060. The image(s) are then associated with the new item and stored into the memory of computer processing unit 1050.

Upon the completion of the corresponding data and photos for the new item, the "store all" icon is selected, whereby the computer processing unit 1050 locates an empty carrier 1011 within the track system 1010 (the empty/occupied status of each carrier 1011 being tracked by computer processing unit 1050) is located an moved via chain 1012 to a corresponding location proximate loading/unloading display station 1070. When the selected carrier 1011 is in the proper position proximate to the loading/unloading display station 1070, actuators 1090 facilitate the transfer of the item on hanger 1014, from hanger holder 1017 to the selected carrier 1011. Information corresponding to the selected carrier 1011 and the RFID information of the item are stored by computer processing unit 1050, with the location of each carrier 1011 being tracked by computer processing unit 1050.

For items that have been previously stored in ACS 1000, a user accesses home screen 6100 whereby a user can select one of the different displayed clothing/garment categories displayed thereon. When a category is selected, the touch screen interface 1076 displays lower level categories for the selected category as illustrated in category screen 6400, which allows the viewing and selection of stored clothing items in that category. By way of example, upon the selection of the "shirts" icon of home screen 6100, category screen 6400 may display various types of shirts, such as T-shirts, dress shirts etc. Upon the selection of a clothing item, item screen 6300 is displayed, whereby the user is presented with the options to: edit or view the stored information corresponding to the selected item; have the item delivered to the loading/unloading display station 1070; find suggested matching or paired outfits; and a calendar to schedule delivery of the item on a selected day and at a selected time.

When the deliver icon is chosen for the selected item, computer processing unit 1050 identifies the location of the selected item, and causes the movement of the corresponding carrier 1011 and hanger 1014 containing the item to a location proximate an empty hanger holder 1017 in the loading/unloading display station 1070. The actuators 1090 transfer the hanger 1014 from the carrier 1011 to the identified empty hanger holder 1017. The computer processing unit 1050 tracks the changed status of ACS 1000. Subsequent to the opening and closing of doors 1072, scanner 1080 performs a scan to detect whether the item has been removed from the loading/unloading display station 1070. If scanner 1080 does not detect the tag of the item, the location is stored into the memory of computer processing unit 1050 as "no tag detected". A "no tag detected" hanger holder 1017 in combination with a "no hanger present" for the hanger holder 1017 is then displayed on the touch screen interface 1076.

If a user selects one of the calendar icons from one of the display screens, the month screen 6500 is displayed on the touch screen interface 1076, giving the user the option of selecting the month and day to schedule the delivery of a chosen item to the loading/unloading display station 1070. Upon the selection of a specific day, the day screen 6600 is displayed on the touch screen 1076, giving the user the option to select the specific time of the deliver of the selected item. In addition to the selected time of day for delivery, a select deliver temperature and/or fragrance can also be selected, such that when the item is delivered to the loading/unloading display station 1070 the item will be heated/cooled to the selected temperature, and, if chosen, the item will be infused with the selected fragrance.

If a user selects the paired outfit icon, from one of the displays, a suggested paired clothing items screen is displayed, which would function the same as the category screen 6400, but with multiple options for clothing items to be paired such as to create an outfit.

The specification has described, at least in part, one or more embodiments. The one or more embodiments described are used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An automatic closet system for inventorying, storing, retrieving, tracking and chronologically monitoring items of clothing to and from a closet storage area, comprising:
    a track extending around at least a portion of the inner perimeter of the storage area, the track including a front track guide and a rear track guide and a slot separating the front track guide and the rear track guide;
    a chain positioned on the rear track guide;
    a motor engaged with the chain, the motor to move the chain around the track;
    at least one hanger for receiving thereon an item of clothing;
    at least one hanger carrier, configured to receive therein the at least one hanger, the at least one hanger carrier including a plurality of legs, with a first of the plurality of legs positioned on the front track guide of the track and a second of the plurality of legs positioned on the rear track guide and engaged with the chain;
    a sensor disposed within the at least one hanger carrier, the sensor to detect the presence of the at least one hanger therein; and
    the track including at least one access slot extending through the front track guide, whereby when the motor moves the chain such that at least one hanger carrier is in alignment with the at least one access slot of the track, the at least one hanger can be placed into or removed from the at least one hanger carrier.

2. The automatic closet system of claim 1, and further including an automatic loading and unloading station, the automatic loading and unloading station including at least one actuator for the automatic loading the at least one hanger into the at least one hanger carrier and for the automatic unloading the at least one hanger from the at least one hanger carrier, wherein the at least one access slot of the track is located in the automatic loading and unloading station.

3. The automatic closet system of claim 2, and further including a controller interfacing with the motor for controlling the motor and thereby the movement of the chain around the track.

4. The automatic closet system of claim 3, and further including a computer processing unit, the computer processing unit for receiving input from the user and for interfacing with the controller.

5. The automatic closet system of claim 4, and further including a display station, the display station including a touch screen user interface coupled to the computer processing unit for at least receiving input from the user.

6. The automatic closet system of claim 5, wherein the display station includes a scanner, a camera and access doors, the access doors being controlled by the controller to facilitate the entry and exiting of a garment from the at least one hanger.

7. The automatic closet system of claim 2, and further including a manual loading and unloading station, the track including a second access slot located in the manual loading and unloading station.

8. An automatic closet system for inventorying, storing, retrieving, tracking and chronologically monitoring items of clothing to and from a closet storage area, comprising:
- a track extending around at least a portion of the inner perimeter of the storage area, the track including a front track guide and a rear track guide and a slot separating the front track guide and the rear track guide;
- a chain positioned on the rear track guide;
- a motor engaged with the chain, the motor to move the chain around the track;
- a plurality of hangers, each for receiving thereon an item of clothing;
- a plurality of hanger carriers, each configured to receive therein one of the plurality of hangers, each of the plurality of hanger carriers including a plurality of legs, with a first of the plurality of legs positioned on the front track guide of the track and a second of the plurality of legs positioned on the rear track guide and engaged with the chain;
- a sensor disposed within each of the plurality of hanger carriers, the sensor to detect the presence of a hanger therein; and
- the track including at least one access slot extending through the front track guide, whereby when the motor moves the chain such when one of the plurality of hanger carriers is in alignment with the at least one access slot of the track, a hanger can be placed into or removed from the corresponding hanger carrier.

9. The automatic closet system of claim 8, and further including an automatic loading and unloading station, the automatic loading and unloading station including at least one actuator for the automatic loading a hanger into a hanger carrier and for the automatic unloading a hanger from a hanger carrier, wherein the at least one access slot of the track is located in the automatic loading and unloading station.

10. The automatic closet system of claim 9, and further including a controller interfacing with the motor for controlling the motor and thereby the movement of the chain around the track.

11. The automatic closet system of claim 10, and further including a computer processing unit, the computer processing unit for receiving input from the user and for interfacing with the controller.

12. The automatic closet system of claim 11, and further including a display station, the display station including a touch screen user interface coupled to the computer processing unit for at least receiving input from the user.

13. The automatic closet system of claim 12, wherein the display station includes a scanner, a camera and access doors, the access doors being controlled by the controller to facilitate the entry and exiting of a garment from the at least one hanger.

14. The automatic closet system of claim 9, and further including a manual loading and unloading station, the track including a second access slot located in the manual loading and unloading station.

15. An automatic closet system for inventorying, storing, retrieving, tracking and chronologically monitoring items of clothing to and from a closet storage area, comprising:
- a track extending around at least a portion of the inner perimeter of the storage area, the track including a front track guide and a rear track guide and a slot separating the front track guide and the rear track guide;
- a chain positioned on the rear track guide;
- a motor engaged with the chain, the motor to move the chain around the track;
- a plurality of hangers, each for receiving thereon an item of clothing;
- a plurality of hanger carriers, each configured to receive therein one of the plurality of hangers, each of the plurality of hanger carriers including a plurality of legs, with a first of the plurality of legs positioned on the front track guide of the track and a second of the plurality of legs positioned on the rear track guide and engaged with the chain;
- a sensor disposed within each of the plurality of hanger carriers, the sensor to detect the presence of a hanger therein;
- the track including at least one access slot extending through the front track guide, whereby when the motor moves the chain such when one of the plurality of hanger carriers is in alignment with the at least one access slot of the track, a hanger can be placed into or removed from the corresponding hanger carrier;
- an automatic loading and unloading station, the automatic loading and unloading station including at least one actuator for the automatic loading a hanger into a hanger carrier and for the automatic unloading a hanger from a hanger carrier, wherein the at least one access slot of the track is located in the automatic loading and unloading station; and
- a manual loading and unloading station, the track including a second access slot located in the manual loading and unloading station.

16. The automatic closet system of claim 15, and further including a controller interfacing with the motor for controlling the motor and thereby the movement of the chain around the track.

17. The automatic closet system of claim 16, and further including a computer processing unit, the computer processing unit for receiving input from the user and for interfacing with the controller.

18. The automatic closet system of claim 17, and further including a display station, the display station including a touch screen user interface coupled to the computer processing unit for at least receiving input from the user.

19. The automatic closet system of claim 18, wherein the display station includes a scanner, a camera and access doors, the access doors being controlled by the controller to facilitate the entry and exiting of a garment from the at least one hanger.

* * * * *